J. E. MURPHY.
AUTOMOBILE CONTROLLING DEVICE.
APPLICATION FILED MAY 15, 1914.

1,261,425.

Patented Apr. 2, 1918.

WITNESSES
M. R. McInnis
E. A. Paul

INVENTOR
JOSEPH E. MURPHY
BY Paul & Paul
ATTORNEYS

UNITED STATES PATENT OFFICE.

JOSEPH E. MURPHY, OF MINNEAPOLIS, MINNESOTA.

AUTOMOBILE-CONTROLLING DEVICE.

1,261,425. Specification of Letters Patent. Patented Apr. 2, 1918.

Application filed May 15, 1914. Serial No. 838,755.

*To all whom it may concern:*

Be it known that I, JOSEPH E. MURPHY, a citizen of the United States, and resident of Minneapolis, in the county of Hennepin and State of Minnesota, have invented certain new and useful Improvements in Automobile-Controlling Devices, of which the following is a specification.

This invention relates to improvements in automobiles, and the object of the invention is to provide an automobile with controlling devices that may be operated by the person who is steering the car, or may be operated by a person located at a distance from such person.

The invention consists generally in the constructions and combinations hereinafter described and particularly pointed out in the claim.

In the drawings, Figure 1 is a vertical section of a portion of an automobile having my invention applied thereto.

Figure 1:
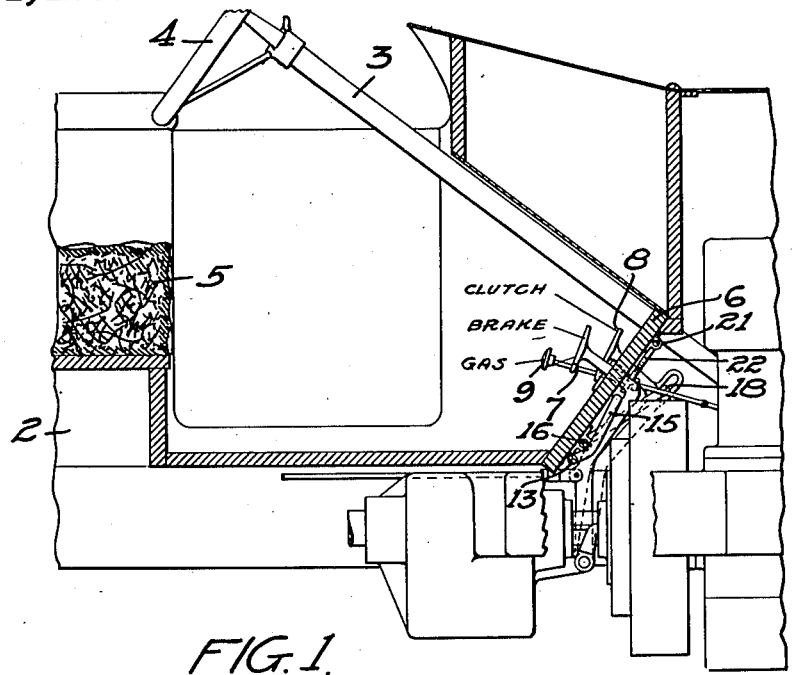
Figure 2:
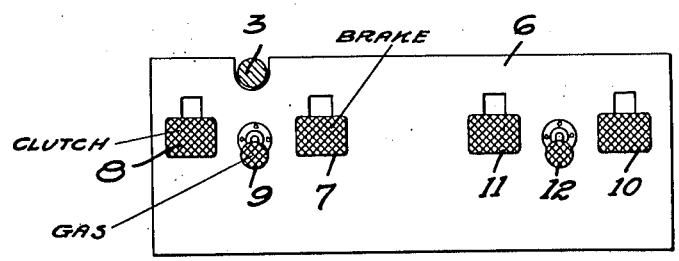
Fig. 2 is an elevation of the foot-board showing the arrangement of the controlling devices and their relation to the steering post or standard.
Figure 3:
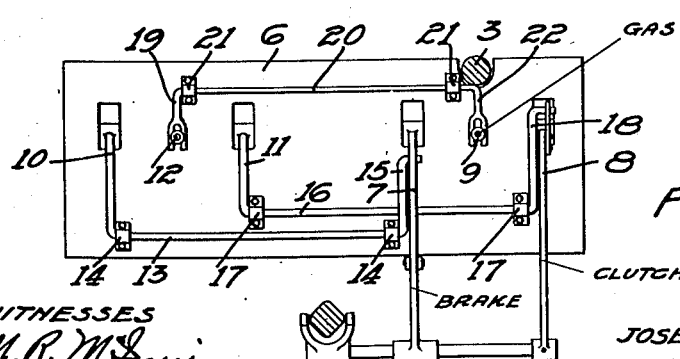
Fig. 3 is an underside view of the foot-board showing the arrangement of the levers in connection therewith.

An ordinary automobile is provided with a steering wheel and post or standard and has arranged in proximity to said standard certain rods or levers for controlling the parts of the machine, such as the clutch, brake and gas supply. These rods or levers are so located that they may be operated by the person who is seated in position to operate the steering wheel. I provide a duplicate set of controlling devices that are located in position to be operated by a person other than the one who is guiding the car. In this way one person can steer the car while another person, preferably seated by his side, can operate the clutch, the brake, and the gas control, or any one of these.

In the drawings, 2 represents a portion of the body of an automobile, provided with a steering post or standard 3, a steering wheel 4 and a seat 5. A person sitting upon the seat 5 in substantial alinement with the wheel 4 and post 3 can steer the car. 6 represents a suitable foot-board upon which is located a brake-lever 7, a clutch lever 8, and a gas controlling rod 9. These parts are all located in proximity to the steering post 3, whereby they may be readily controlled by the person who is seated in position to operate the steering wheel of the car.

I also provide, preferably upon the foot-board 6, in position to be operated by a person seated by the side of the person who is steering the car, duplicate controlling devices 10, 11 and 12. As here shown, the lever 10 is connected to a short shaft 13 mounted in bearings 14 on the underside of the foot-board 6, and provided with an arm 15 that engages the brake lever 7. The lever 11 is connected with a shaft 16 mounted in bearings 17 on the underside of the foot-board and having an arm 18 that is connected with the clutch lever 8. The gas controlling rod 12 is connected to a lever 19 that is in turn connected with a shaft 20 mounted in bearings 21 on the underside of the foot-board and having an arm 22 that is connected with the gas controlling rod 9. These connections may, of course, be modified in many particulars without departing from the principle of my invention.

It will be seen that a person seated at a distance from the steering post, as for example by the side of the person who is in position to steer the machine, may operate any one of the controlling devices. The person who is steering the car may give his entire attention to that operation, and he is not required to give any attention to the brake, the clutch or the gas control. All of these devices can be operated by another person who is in position to operate the controlling levers or devices 10, 11 and 12.

With this arrangement the person who is learning to drive an automobile can take the driver's seat and give his entire attention to steering the car, while another person, preferably seated by him, will control the clutch, the brake, the gas controlling rod and any other devices for controlling the machine, which may be arranged to be operated by a person other than the one who is steering the car.

I do not limit myself to the details of construction herein shown and the same may be modified in many particulars without departing from my invention.

I claim as my invention:

The combination, in an automobile, with a suitable foot-board, a steering post extending upward from said foot-board at one side of the center thereof, and clutch, brake and gas controlling devices located on said foot-board in proximity to said steering post, of an independent set of clutch, brake and gas controlling devices located upon said foot-board at the other side of the center of the foot-board, and means connecting said two sets of controlling devices, whereby the car can be guided and controlled by the same person, or can be guided by one person and controlled by another seated by the side of the person who is steering, substantially as described.

In witness whereof, I have hereunto set my hand this 13th day of May, 1914.

JOSEPH E. MURPHY.

Witnesses:
  GENEVIEVE E. SORENSEN,
  EDWARD A. PAUL.